United States Patent [19]

Statt

[11] 4,353,643

[45] Oct. 12, 1982

[54] MULTIMAGNIFICATION MODE OPTICAL SYSTEM WITH ROTATING AND TRANSLATING LENS

[75] Inventor: William L. Statt, Webster, N.Y.

[73] Assignee: Xerox Corporation, Stamford, Conn.

[21] Appl. No.: 155,705

[22] Filed: Jun. 2, 1980

[51] Int. Cl.[3] .......................... G03B 27/34; G03B 27/40; G03B 27/70

[52] U.S. Cl. .......................................... 355/57; 355/8; 355/11; 355/51

[58] Field of Search .................. 355/8, 57, 60, 66, 11, 355/58, 51

[56] References Cited

U.S. PATENT DOCUMENTS

| | | | |
|---|---|---|---|
| 3,286,587 | 11/1966 | Hayden et al. | 355/57 |
| 3,614,222 | 10/1971 | Post et al. | 355/8 |
| 3,884,574 | 5/1975 | Doi et al. | 355/66 |
| 4,007,986 | 2/1977 | Komori et al. | 355/57 |
| 4,013,361 | 3/1977 | Allis | 355/60 |
| 4,053,221 | 10/1977 | Lynch | 355/60 |
| 4,118,118 | 10/1978 | Barto, Jr. | 355/8 |
| 4,120,578 | 10/1978 | Daniels | 355/8 |
| 4,135,812 | 1/1979 | Kingsland | 355/51 |
| 4,142,793 | 3/1979 | Schilling | 355/58 |

*Primary Examiner*—Richard A. Wintercorn

[57] ABSTRACT

A multimagnification mode optical system for projecting an image from an object plane to an image plane including a viewing platen, a lens, at least one reflecting surface on each of the object side and image side of the lens, the lens being mounted to move from a first position providing a first magnification to a second position providing a second magnification by simultaneously rotating and translating about a stationary lens shaft from said first position to said second position whereby the optical axis of the lens is also altered. In a specific application of the optical system the corner registration of the image at the image plane on a photosensitive surface mounted on a rotatable drum is maintained at both the first and second lens position.

10 Claims, 7 Drawing Figures

MULTIMAGNIFICATION MODE OPTICAL SYSTEM WITH ROTATING AND TRANSLATING LENS

CROSS REFERENCE TO RELATED APPLICATIONS

Reference is made to copending U.S. Application Ser. No. 155,706 entitled Multimagnification Mode Optical System With Pivotal Reflector of David O. Kingsland and Robert A. Schaeffer filed concurrently herewith.

BACKGROUND OF THE INVENTION

This invention relates to an optical scanning system and particularly to a compact optical scanning system for a reproducing machine capable of producing copies from originals of more than one magnification.

In a typical reproducing machine the optical scanning system reflects light rays or images from successive portions of an original document which is held on a transparent viewing platen. The light rays are provided by an illumination source which together with a reflector or mirror is supported for movement relative to the document supported on the viewing platen. As the mirror moves past the document, the light rays reflected from the document strike the mirror and are reflected onto another mirror from which they are directed through a lens and finally onto a photosensitive material which typically is a rotatable drum, the drum being adapted for movement in the same direction and at the same speed as the illumination source and first mirror discussed above.

In the foregoing manner, images of successive portions of the original document are flowed onto successive portions of the photosensitive drum to thereby produce a latent image of the document in accordance with well known techniques. In providing a copy of the document by the foregoing type of optical projection system it is necessary to maintain constant the distances over which the light rays travel from the document to the lens and from the lens to the photosensitive drum or at least a constant ratio therebetween should be maintained. This can be accomplished by the provision of a stationary lens and first and second mirror assemblies which direct the rays from the document and which are movable with respect to one another, the second mirror assembly being moved at one half the speed of the first mirror assembly whereby the document to lens distance is maintained constant. Such a copying apparatus is capable of producing copies of the original at one magnification which is usually a one-to-one ratio.

With the continued development and increasing use of reproduction machines it has been increasingly desired and popular to provide reproduction capability in the machine at more than one magnification. In the past copies at more than one magnification have been provided by using a plurality of lenses having different magnifying powers and substituting one lens for another according to the degree of magnification desired.

Another apparatus for producing copies of originals at different magnifications simultaneously moves the lens and reflecting mirrors, the lens generally being moved a much smaller distance than the mirror. By so doing the length of the object conjugate, the length of the optical path from the object plane to the lens, and the image conjugate, the length of the optical path from the lens to the image plane, are changed. For a one-to-one magnification, the object conjugate and image conjugate are equal. For a reduction magnification the object conjugate is longer than the image conjugate. In addition, in such a system in obtaining a less than one-to-one magnification the original is generally scanned at a faster rate. In still other similar systems with variable magnification an add lens may be provided to compensate for lens movement.

DESCRIPTION OF THE PRIOR ART

Representative of the prior art in this respect is U.S. Pat. No. 3,884,574 to Doi et al which describes a plural magnification reproducing apparatus with first and second moving mirror assemblies wherein the second mirror assembly and the lens may be set to different positions to produce different lens to original and lens to exposure surface ratios and wherein the first and second mirror assemblies are driven at different speed ratios. In this system by activating a switch a system of motors, pulleys, cables, cams and switches are activated to move the lens and mirror assemblies into a second position and the speed of the scanning mirror assembly is altered.

Such a system typically has a complicated and expensive switching mechanism to move the lens and the mirrors accurately from the base position to the desired reduction position.

Other prior art systems having a single lens for plural magnification have typically used cam activated and cable pulley driven mechanisms to change the lens magnification.

The prior art approaches described above are generally complicated to operate, relatively complicated in construction and require precise adjustment of the lens and mirrors when changing from one magnification ratio to another.

SUMMARY OF THE INVENTION

In accordance with this invention a novel multimagnification mode optical system is provided. In particular an optical system with a novel lens positioning change approach for use in multimagnification modes is provided.

More specifically, the present invention is directed to a multimagnification mode optical system for projecting an image of an object from an object plane to an image plane wherein disposed along the object path are support means to support an object at said object plane, a lens at a first position and at least one reflecting surface on each of the object side and image side of said lens and a photosensitive surface at the image plane to receive the projected image, the length of the optical light path from the object plane to the lens relative to the length of the optical light path from the lens to the image plane forming a first image magnification ratio and activating means to simultaneously rotate and translate the lens about and along a stationary axis in three dimensional space to a second position to increase the light path from the object to the lens and thereby alter the magnification ratio and the optical axis of the lens.

In a specific concept of the present invention the lens is movably mounted on a stationary shaft for rotation and translation about the shaft and includes a stationary cam plate parallel to the lens to rotatably guide the lens as it translates the length of the lens shaft from a first position to a second position.

In a further aspect of the present invention corner registration at the image plane on the photosensitive surface is maintained at both the first and second lens positions.

In an additional aspect of the present invention the lens is automatically driven from its first position to its second position in response to automatically conditioning the optical system to operate in a different magnification mode.

Accordingly it is an object of the present invention to provide an improved multimagnification mode optical system.

It is a principle object of the invention to provide a mechanically simple mechanism for achieving both one-to-one and one additional magnification mode in an optical scanning system.

It is an additional object of the present invention to provide a device for automatically three dimensionally positioning a lens in both first and second mode of operation.

It is a further object of the invention to maintain corner registration of the image on the drum while changing from a first magnification mode to a second magnification mode.

It is a further object of the present invention to provide an optical system providing different magnification which is easy to operate and whose optical components can be precisely positioned when moving the components to accomodate different magnifications.

For a better understanding of the invention as well as other objects and further features thereof reference is had to the following description and the included drawings.

DESCRIPTION OF PREFERRED EMBODIMENT

The invention will now be described by reference to a preferred embodiment of the multimagnification mode optical scanning system.

Figure 1:
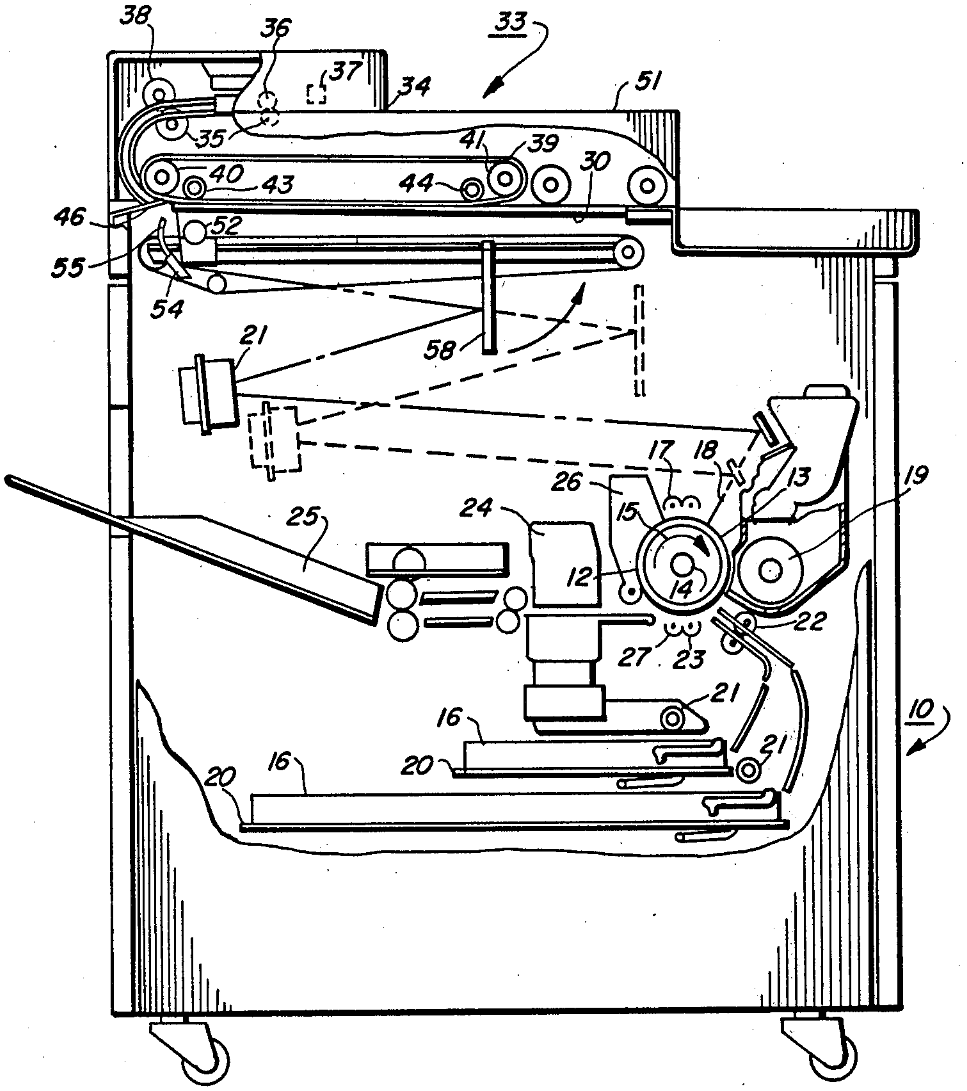
FIG. 1 is a schematic representation of an automatic xerographic reproduction machine employing the multimagnification mode optical system of the present invention.

Referring now to FIG. 1, there is shown by way of example an automatic xerographic reproduction machine 10 which includes the optical scanning system of the present invention. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in the application to the particular embodiment or embodiments shown herein.

The reproducing machine 10, illustrated in FIG. 1 employs an image recording drum-like number 12, the outer periphery of which is coated with a suitable photoconductive material 13. The drum 12 rotates about shaft 14 in the direction indicated by arrow 15 to bring the image-bearing surface 13 thereon past a plurality of xerographic processing stations.

The drum 12 moves the photoconductive surface 13 through a charging station 17 where an electrostatic charge is placed uniformly over the photoconductive surface 13. Thereafter, the drum 12 is rotated to exposure station 18 wherein the charged photoconductive surface 13 is exposed to a light image of the original input scene information whereby the charge is selectively dissipated in the light exposed regions to record the original input scene in the form of an electrostatic latent image. After exposure, drum 12 rotates the electrostatic latent image recorded on the photoconductive surface 13 to development station 19 wherein a conventional developer mix is applied to the photoconductive surface 13 of the drum 12 rendering the latent image visible.

Sheets 16 of the final support material are supported in a stack arrangement on a stack support tray 20. With the stack at its elevated position a sheet separator 21 feeds individual sheets therefrom to the registration system 22. The sheet is then forwarded to the transfer station 23 in proper registration with the image on the drum. The developed image on the photoconductive surface 13 is brought into contact with the sheet 16 of final support material within the transfer station 23 and the toner image is transferred from the photoconductive surface 13 to the contacting side of the final support sheet 16. Following transfer of the image the final support material which may be paper, plastic, etc., as desired, is transported through detack station where detack corotron 27 uniformly charges the support material to separate it from the drum.

After the toner image has been transferred to the sheet of final support material 16 the sheet with the image thereon is advanced to a fuser 24 which coalesces the transferred powder image thereto. After the fusing process the sheet 16 is advanced to a suitable output device such as tray 25. The residual toner particles remaining on the photoconductive surface 13 after the transfer operation are removed from the drum 12 as it moves through a cleaning station 26.

The document handler 33 includes as an input station, a sheet feed table 51, a copying sheet receiving slot 34, sheet alignment feed roll 35 and cooperating pinch device 36. When a sheet is inserted it makes switch 37 which activates sheet alignment roll 35 which feeds the sheet forward and aligns it against the rear or side registration edge of the document handler. The pinch rolls 38 are activated when a switch is made to feed a document around the 180° curved guides onto the platen 30. The platen belt transport is comprised of a single wide belt 39 having one run over the platen 30. The belt 39 is wrapped about two pulleys 40 and 41 which are arranged such that the belt surface at the bottom of the pulley with the assistance of input backup roll 43 and output backup roll 44 is in light contact with the platen.

The document is driven by the belt 39 across the platen until the trailing edge of the document has cleared registration edge 46 after which the platen belt transport is stopped and the direction in which the document is driven is reversed so that it is registered against registration edge 46 and is now ready for copying.

Figure 2:
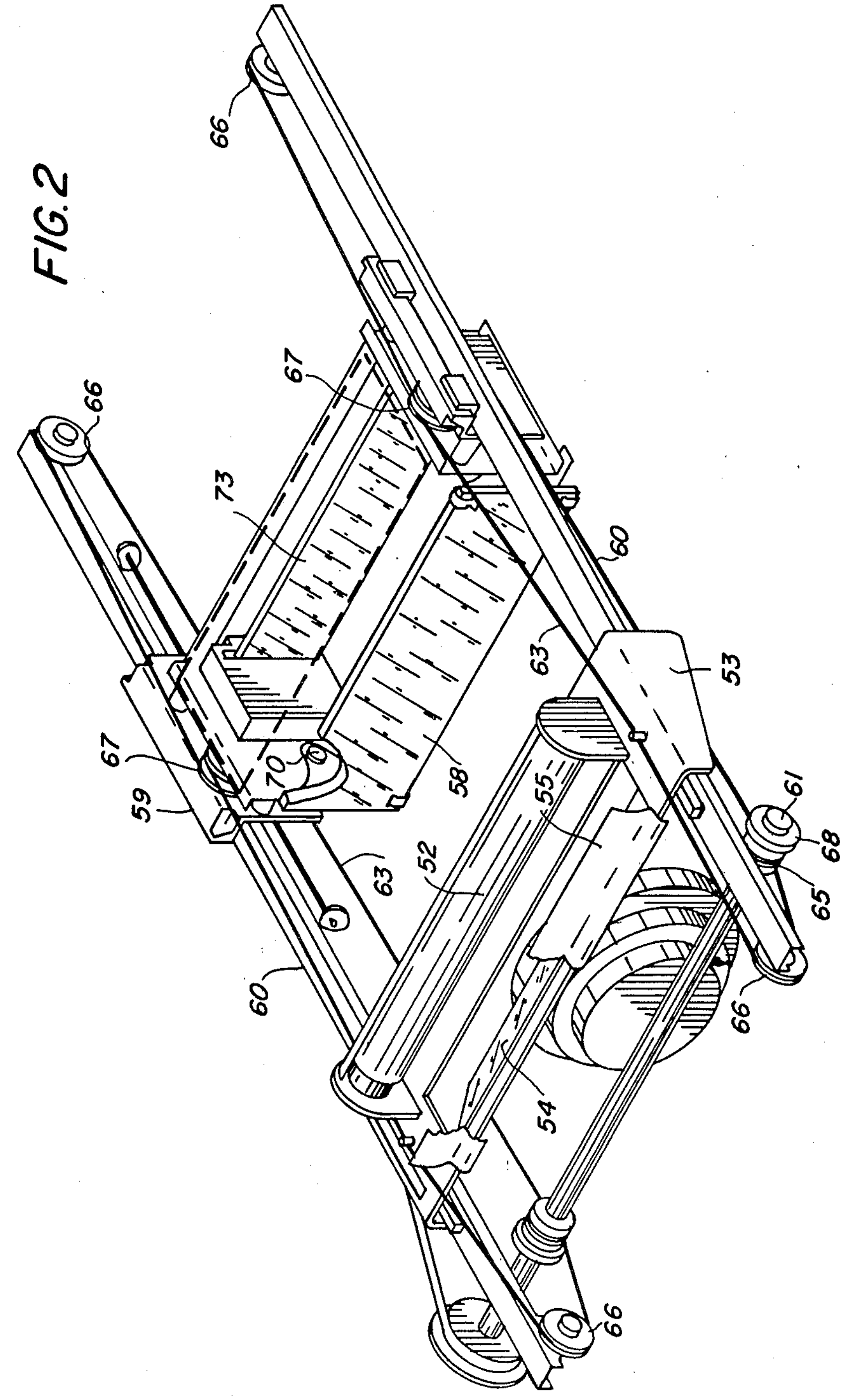
FIG. 2 is an isometric view from the front of the full rate and half rate optical scanning carriage of the present invention.
Figure 3:
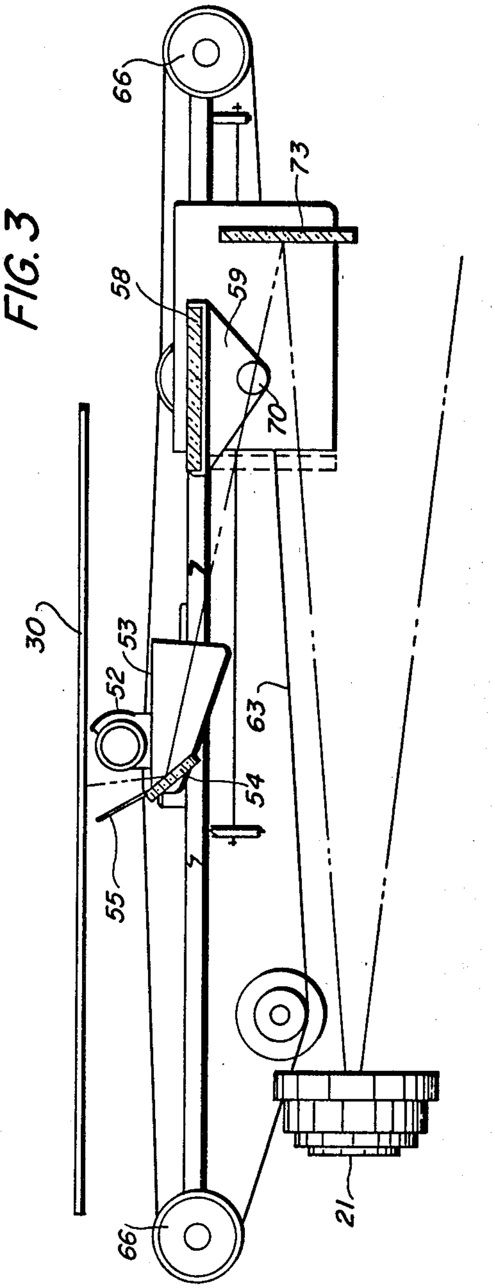
FIG. 3 is a side view of the optical scanning system with the second scanning mirror pivoted up to the stored position (solid line) and showing the second scanning mirror in the operative position (dashed line).

The optical system will now be described with further detail and with additional reference to FIGS. 2 and 3. In the base mode of operation which typically produces a faithful reproduction in a one-to-one magnification ratio, the copier is operated to produce a copy of a document which is placed image side down upon a horizontal viewing platen 30. Reproduction is accomplished by the full rate mirror 54 scanning the entire original document. Positioned in the full rate scanning carriage 53 with the full rate mirror 54 are the illuminating lamp 52 and the object reflector 55. As the full rate mirror 54 scans the original document on the platen 30 the half rate mirror 58 mounted on half rate carriage 59 moves at one half the rate of the full rate mirror 54 to maintain the object to lens conjugate equal to the lens to image conjugate of the system. Typically the length of the scan of the full rate mirror 54 is the length of a normal letter size document. With larger oversize documents clearly the length of scan of the full rate mirror must be at least as large as the document and the half rate scanning mirror must also be moved an additional distance at one half the rate of the full rate mirror to maintain the object conjugate equal to the image conjugate.

Both the full rate mirror carriage 53 which also contains the illuminating lamps 52 and the reflector 55, and the half rate mirror carriage 59 ride on parallel optical guide rails 60 and are driven through the optics drive shaft 61 which is driven from a main drive belt from the machine main drive motor (not shown). The carriages 53 and 59 are driven on both sides from the optics shaft 61 by means of cables 63 which are coiled around capstans 65 and which are wrapped around optics idler wheels 66. With the arrangement shown in FIG. 2 the cable is wrapped around idler wheels 67 which are fixed to and transport the half rate carriage such that for each unit of movement of the full rate carriage the half rate carriage moves one half the unit distance. In this manner the total object conjugate is maintained constant. Further to maintain the stability of the half rate carriage 59 the greatest possible spread between the front and rear carriage slide pads is desired.

Light rays from the object are reflected from half rate mirror 58 to the half lens system 21 which collects light from the input side of the lens and forms an image after being reflected from the drum mirror 69 at the imaging drum 12.

In another magnification mode which typically is a reduction mode as schematically seen in phantom in FIG. 1 the half rate mirror 58 should be positioned further away from the full rate mirror 54. In addition the lens 21 and the drum mirror 69 are moved slightly thereby altering the ratio of the object conjugate to the image conjugate to provide the new magnification. Both the half rate mirror 58 and the drum mirror are moved to change the overall object conjugate to image conjugate relatively and thereby the image magnification. The lens 21 is moved to change the focus and maintain the changed magnification. In addition as more specifically seen from FIG. 4, the lens is moved from the base position both to the side forward and down in the reduction mode. This is done to continue to maintain the corner registration feature of the machine. In addition to repositioning the lens, half rate mirror and drum mirror, the scanning speed of both the half rate and full rate mirror is increased to maintain the magnification correct in the scanning direction.

Figure 4:
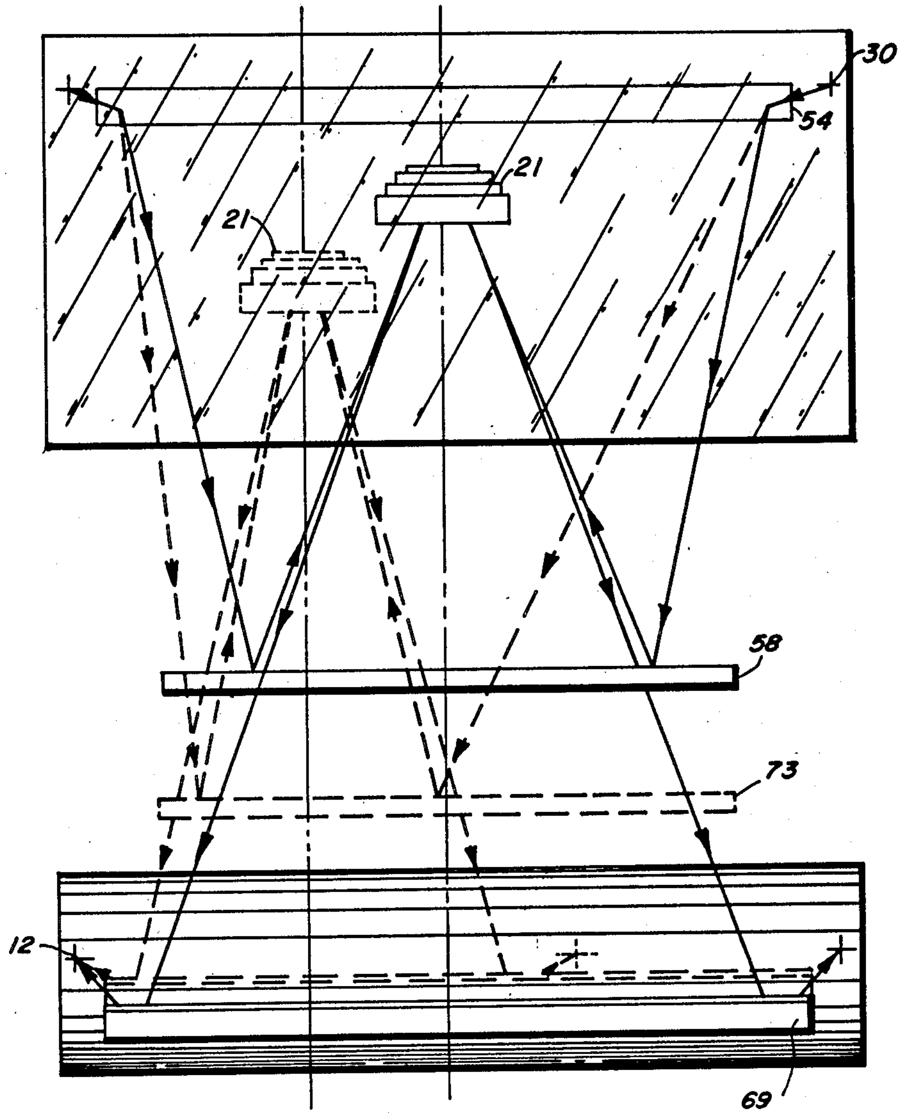
FIG. 4 is a top schematic view illustrating the optical path of an image in a first magnification mode (solid line) and in a second mode of reduced magnification (dotted line).

With particular reference to FIG. 4, the optical ray paths are shown for two magnifications, here represented as a one-to-one magnification with the optical ray path in solid line and as a reduction mode with the optical ray path in dashed line. In the one-to-one magnification mode the object is viewed on platen 30, the light rays reflected to the full rate mirror 54, the half rate mirror 58, through the lens 21 and back out onto the drum mirror 69 and finally onto the drum 12. With original object registration in the upper right hand corner of FIG. 4 the image registration is achieved on the left hand side of the drum. This registration from object to image is desired to insure that there is registration of the image on the drum at the same place all the time to enable all the image to be transferred to the selected size of copy paper. For example, in a reduction mode the image of a large original document is reduced in size. If the image were not registered on one side of the drum it would be difficult to insure that the transfer copy paper would be fed to that portion of the drum bearing the toner image. The final copy support sheet is fed to be registered only on the left edge of the drum as represented in FIG. 4. Therefore as seen in FIG. 4 the lens in the reduction mode is repositioned to the left to maintain corner registration of the image on the drum. To maintain corner registration when changing from one to one magnification to a reduction magnification the optical axis of the system is changed. In this sense the optical axis is intended to define an imaging plane that is perpendicular to the drum axis and other machine operations much like a center line of the machine when in the one to one magnification. When the lens is moved for the reduced magnification, the optical axis is shifted with the lens from the center line of the machine and lens to the center line of the lens only. FIG. 4 illustrates these changes in center line of lens and thereby the change in optical axis.

Referring once again to FIGS. 2 and 3, the half rate scanning carriage 59 has two mirrors mounted thereon to provide two object conjugate lengths when each is used in the optical system. Half rate mirror 58 is pivotally mounted to both sides of the mirror carriage so that it may be used in its base position (dashed line FIG. 3) as the half rate mirror or pivoted about pivot points 70 to the top of the half rate scanning carriage out of the optical path of the image ray from the full rate mirror. When in this position and as more clearly seen in FIG. 3, the image ray strikes the second half rate mirror 73 which is also mounted to half rate mirror carriage 59 but to the rear of or behind in the optical sense of half rate mirror 58 when it is in its operative position. Thus by a simple pivoting or flipping mechanism the half rate scanning carriage can be changed to provide a longer object conjugate. In this way an automatic reproducing machine with a full rate and half rate scanning optical system may be readily adapted to provide both one-to-one and a selected reduction mode of copying.

In operation in a compact environment during the scanning operation the full rate carriage may at the end of its scan actually overrun the starting position of the half rate carriage at the beginning of scan. Since the half rate carriage moves from its start of scan position it may be provided with a relatively large "footprint" or rest on the guide rails 60, thereby providing enhanced quality of scanning motion that is comparatively stable and relatively free of vibration.

From the above description it should be apreciated that the half rate carriage with two half rate mirrors, one pivotably mounted in front of the other for movement out of the optical ray path when the larger object conjugate is desired is provided. This provides the advantage of a relatively simple low mass scanning apparatus. It doesn't require the use of additional mirror carriages or complicated position change drive mechanism of the prior art devices but rather provides a low cost alternative which can be used in a compact environment. Changing the object conjugate merely by flipping a first mirror up to a stored position is relatively simple compared to the complex mechanisms required to move and relocate the entire lens carriage of the prior art devices.

Figure 5:
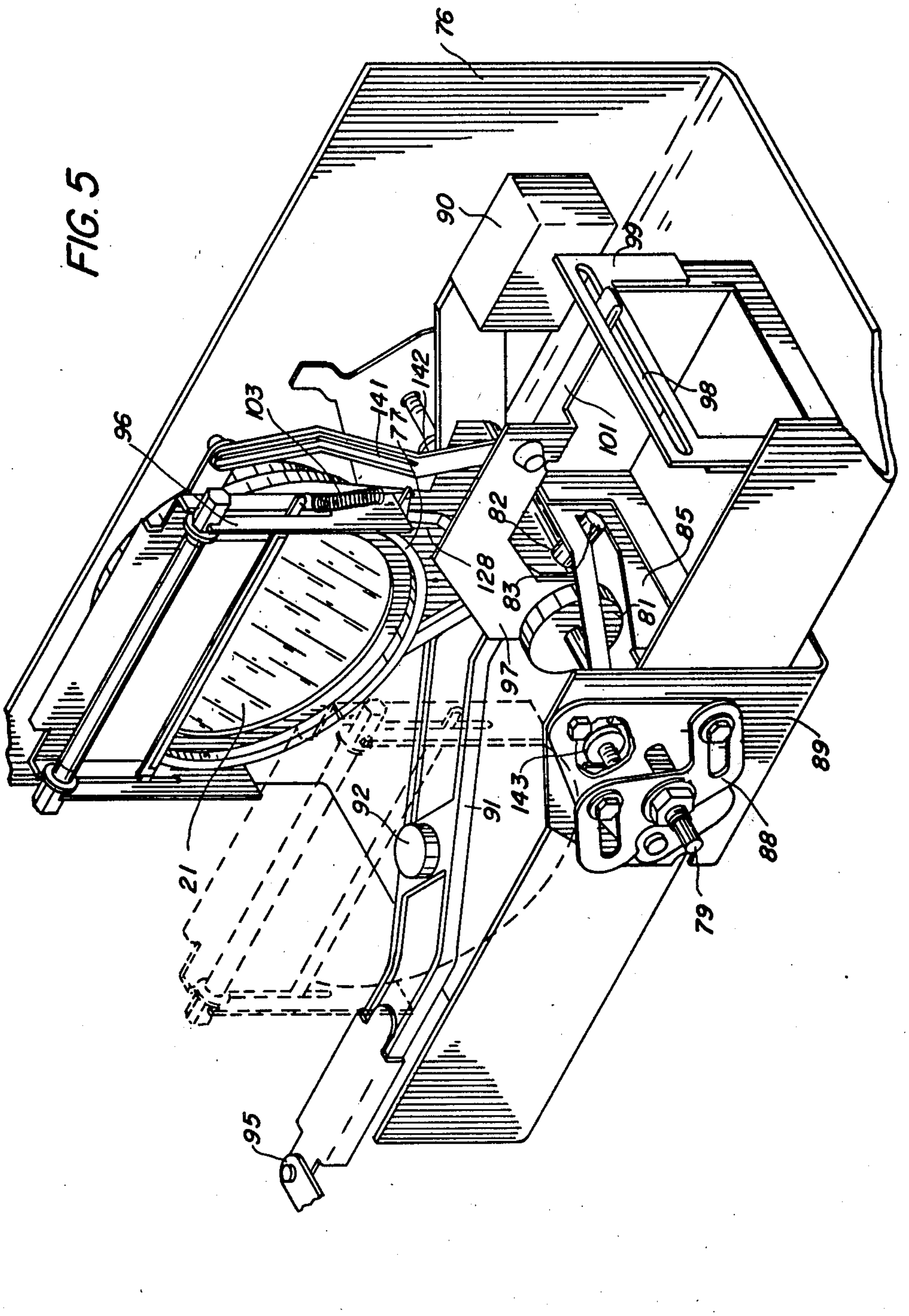
FIG. 5 is an isometric view of the lens and the lens position changing mechanism.

Turning now to the mechanism for adjusting the position of the lens, attention is directed to FIG. 5 wherein the lens position is shown in solid line in the one-to-one magnification and in dashed line in the reduction magnification mode.

Figure 5A:
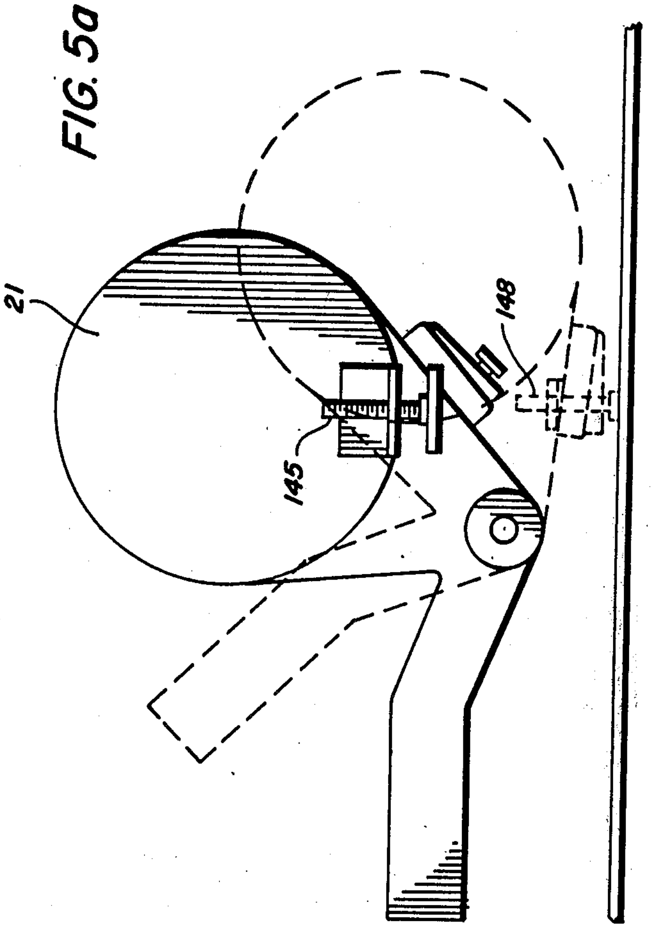
FIG. 5*a* is a rear view of the lens illustrating the lens position vertical stops in both the one to one (solid line) and reduced magnification (dotted line) position.

The entire lens assembly is mounted to a lens assembly tie bar 76 which is fixedly attached to the main machine frame and within which the lens is moved from a base position to a reduction position. The lens 21 is contained within lens mount 77 which is attached to lens carriage support brackets 78 which in turn are mounted on lens shaft 79 to enable the lens to move forward and back along the shaft 79. Suitable bushings can be used on the lens support brackets to ensure low friction when sliding on the shaft. Attached to the side of the lens carriage is a support pin 82 which has a roller 83 at its end which rides in track 84 in cam track plate 85. The cam track plate 85 is attached to the lens assembly tie bar 76. The lens shaft 79 is mounted in lens mounting plate 88 which is mounted to bracket 89 in the front and to a mounting plate (not shown) in the rear. Therefore as the lens is moved forward from one-to-one position to a reduction position up the angled cam track plate 85 it is tilted down and to the left by the upward movement of the roller 83. As the lens is moved forward and back and up and down the angled cam track plate the counterbalance 90 acts to lower the force needed to spiral the lens as it travels along the lens shaft. Lens stops at the front and rear of the lens assembly are provided to accurately position the lens in position both vertically and horizontally in its two magnification modes. The horizontal lens stops include adjustable threaded screws 142, 143 mounted to the tie bar 76 and the bracket 89 respectively. These stops inhibit further horizontal movement as the screws engage stop surfaces on the lens mount and moves back and forth along the shaft 79. As seen in FIG. 5*a*, the vertical lens stops are accomplished in a similar manner. In the one to one or home position adjustable screw 145 mounted at the front of the lens mount 21 comes to rest on plate 146. Similarly in the reduction mode as the lens moves forward it is rotated about lens shaft 79 so that adjustable screw 148 mounted on the rear of the lens mount 21 comes to rest on tie bar 76.

The lens is moved from position to position by means of arm 91 which pivots about pivot point 92 and which is driven forward and back through linkage 95 by the mechanism shown in FIG. 6 to be described later. The lens assembly may also be equipped with a sagital stop mechanism 96 mounted in front of the lens mount 77. The sagital stop mechanism 96 is connected to frame member 97 through link 141 and is also connected to the lens mount 77. Frame member 97 has an arm 101 which moves forward and backward in slot 98 of slotted member 99. Thus as the lens moves forward and backward the sagital stop mechanism also moves forward and back and in addition is maintained in its horizontal configuration by slotted arm 101 riding in slot 98 of fixed member 99.

In this lens assembly the lens is simultaneously rotated about a lens shaft and translated along the shaft. With the use of a single lens shaft and an angled cam track the lens is fully transported between at least two magnification positions. This is accomplished without the necessity of providing a three dimensional stage in which the lens is first moved in the X direction, then in the Y direction and finally in the Z direction, all the movements potentially requiring different driving forces and guiding channels. The present system provides a means to maintain focus and corner registration while being moved from magnification position to magnification position on a simulated three dimensional stage. In a system with multiple magnification if one were to move the lens to change magnification and preserve corner registration, the lens path would be some complex curve. However for a system having only two magnifications and therefore only two final set points, these can be fitted to a circle. The necessary rotational motion can be imparted to the system by having the lens pivotally mounted about a shaft which corresponds to the center of the circle on which the set points exist. In a system with only two magnifications one of the magnifications is typically a one to one magnification ratio while the other magnification is a reduction ratio. While any reduction ratio may be selected, ratios of 0.616 and 0.714 have frequently been choosen since they can provide reduction from 11 inch by 17 inch or 11 inch by 14 inch to 8½ inch by 11 inch paper respectively.

Figure 6:
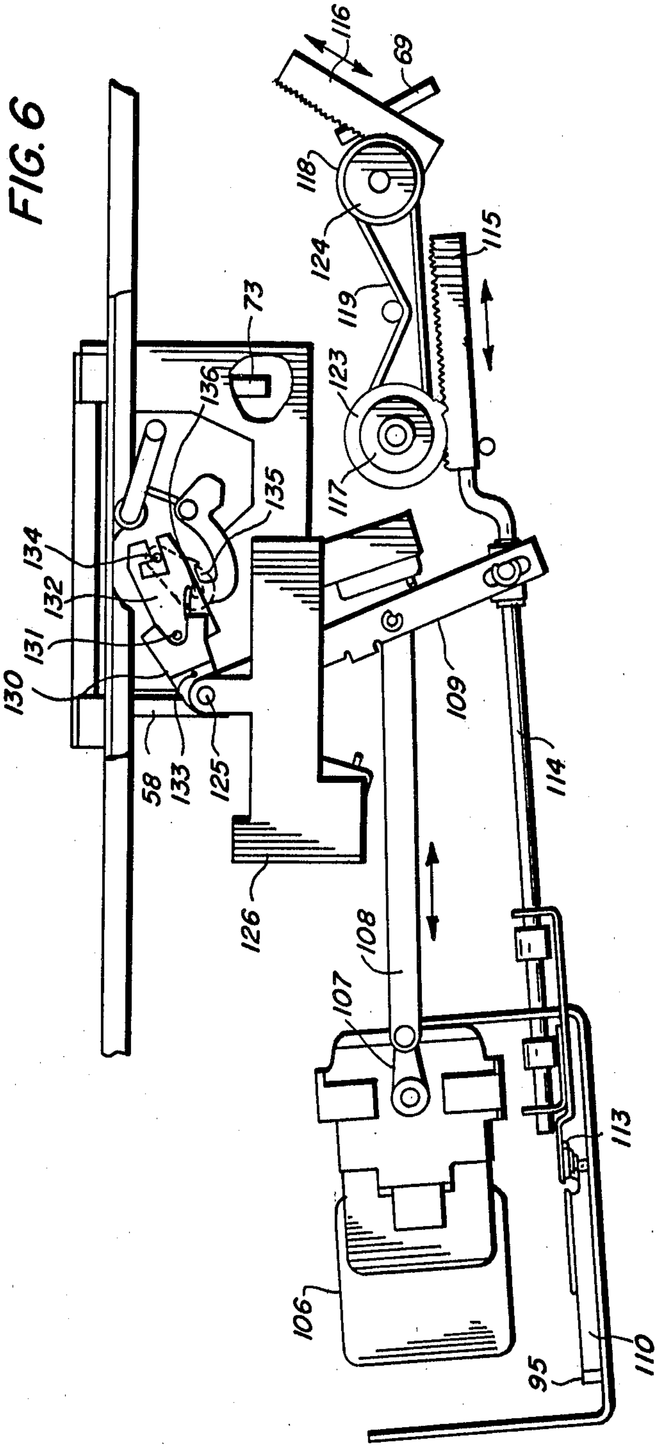
FIG. 6 is a side view of the magnification mode changing mechanism.

With particular attention to FIG. 6 wherein the entire mechanism for changing the magnification mode is illustrated, the operator selects a different magnification selection button on the control panel which activates motor 106 which through crank 107 drives arm 108 to the left or right. Arm 109 is pivoted about pivot point 125 in frame 126 and at its bottom moves connecting shaft 114 from the left to the right. Connecting shaft 114 through linkage 113 drives lens positioning arm 110 which drives the lens into or out of position. When the arm 109 drives to the right the lens positioning arm drives the lens to the home or one-to-one position. At the other end of shaft 114 is a rack 115 which through pinion 117 drives belt 119 about pulleys 123, 124 driving pinion 118 which in turn drives rack 116 thereby altering the position of drum mirror 69. When the arm 109 is moved to the right the drum mirror 69 is in the home position. Also fastened to arm 109 at arm pivot point 125 is crank 130 which when the arm 108 is driven to the left is driven down where it engages stud 131 in latch 132. As the latch 132 moves down pivoting about pivot 133 it engages pin 134 mounted on mirror frame 135 which pivots about mirror pivot 136. As the mirror frame is moved down it pivots mirror 58 up out of position. Once pivoted out of position the alternative mirror 73 is in the optical path of the scanning system. In addition once the mirror 58 is pivoted to the inoperative position it may be locked in position to insure that it stays out of the optical path during repeated scanning of the mirror carriage. To return the mirror 58 to the operative position, the mirror frame 135 is unlatched from the stored position and pivoted down by the reverse action of the motor 106 and mechanism described above.

It should be appreciated that the described device may be modified and varied by the skilled artisan upon a reading of the present disclosure. For example while the description has been limited to a home position for the lens and a single reduction position for the lens, the lens carriage could be equipped for positioning at more than one reduction position by making the lens shaft adjustable for a plurality of reduction modes. That is the shaft would be adjustable to provide the center of several circles upon which both the home magnification position and at least one reduction position are present. All these concepts and others are intended to be within the scope of the present invention.

I claim:

1. In a multimagnification mode optical system for projecting an image of an object from an object plane to an image plane including the following disposed along an optical path, support means to support an object at said object plane, a lens at a first position, at least one reflecting surface on each of the object side and image side of said lens and a photosensitive surface at said image plane to receive said projected image, the length of the optical light path from the object plane to the lens relative to the length of the optical light path from the lens to the image plane forming a first image magnification ratio, the improvement including means to simultaneously rotate and translate said lens about and along a stationary axis in three dimensional space to a second position whereby the length of the optical light path from the object to the lens is increased thereby forming a second image magnification ratio and whereby the optical axis of said lens is altered.

2. The multimagnification mode optical system of claim 1 wherein said at least one reflecting surface on the object side of the lens comprises a first optical scanning carriage with a first reflector and a second optical scanning carriage including a second reflector.

3. The multimagnification mode optical system of claim 1 wherein said stationary axis is a stationary shaft and said lens is movably mounted for rotation and translation about said shaft and including means to rotatably guide said lens as it translates the length of the stationary shaft from a first position which forms a first magnification ratio to a second position which forms a second magnification ration.

4. The multimagnification mode optical system of claim 3 wherein said guide means includes a stationary cam plate parallel to said lens shaft and, means attached to said lens mounting for cooperative association with said cam plate to rotate said lens about said lens shaft as said lens is moved from said first position to said second position.

5. The multimagnification mode optical system of claim 4 wherein said means attached to said lens mounting for cooperative association with said cam plate comprises a support pin mounted on the lens support for cooperative association with a cam surface cut into said cam file.

6. The multimagnification mode optical system of claim 1 wherein said means to simultaneously rotate and translate said lens includes a driven pivotal lever attached to said lens.

7. The multimagnification mode optical system of claim 1 further including a sagital stop mechanism mounted about said lens and means to maintain said sagital stop mechanism horizontal as said lens is rotated about said lens axis.

8. The multimagnification mode optical system of claim 2 including means to drive said second optical scanning carriage at one half the speed of the first optical scanning carriage.

9. The apparatus of claim 1 including means to automatically drive said lens from its first position to its second position in response to means to condition the optical system to operate in a different magnification mode.

10. In a multimagnification mode optical system for projecting an image of an object from an object plane to an image plane including the following disposed along an optical path, support means to support an object at said object plane, a lens at a first position, at least one reflecting surface on each of the object side and image side of said lens and a photosensitive surface at said image plane to receive said projected image, the length of the optical light path from the object plane to the lens relative to the length of the optical light path from the lens to the image plane forming a first image magnification ratio, the improvement including means to simultaneously rotate and translate said lens about and along a stationary axis in three dimensional space to a second position whereby the length of the optical light path from the object to the lens is increased thereby forming a second image magnification ratio, the optical axis of said lens is altered, and the corner registration at the image plane on the photosensitive surface is maintained at both the first and second lens positions.

* * * * *